(12) United States Patent
Tago et al.

(10) Patent No.: US 12,018,115 B2
(45) Date of Patent: Jun. 25, 2024

(54) POLYURETHANE GEL MATERIAL, POLYURETHANE GEL, PSEUDO-BIOMATERIAL, AND PRODUCING METHOD OF POLYURETHANE GEL

(71) Applicant: MITSUI CHEMICALS, INC., Tokyo (JP)

(72) Inventors: Hiroaki Tago, Chiba (JP); Hiroshi Kanayama, Chiba (JP); Makoto Kajiura, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 918 days.

(21) Appl. No.: 17/045,022

(22) PCT Filed: Apr. 2, 2019

(86) PCT No.: PCT/JP2019/014590
§ 371 (c)(1),
(2) Date: Oct. 2, 2020

(87) PCT Pub. No.: WO2019/194162
PCT Pub. Date: Oct. 10, 2019

(65) Prior Publication Data
US 2021/0139639 A1 May 13, 2021

(30) Foreign Application Priority Data

Apr. 5, 2018 (JP) .................... 2018-073421

(51) Int. Cl.
*C08G 18/79* (2006.01)
*C08G 18/48* (2006.01)
*C08G 18/73* (2006.01)

(52) U.S. Cl.
CPC ......... *C08G 18/79* (2013.01); *C08G 18/4825* (2013.01); *C08G 18/73* (2013.01)

(58) Field of Classification Search
None
See application file for complete search history.

(56) References Cited

U.S. PATENT DOCUMENTS

| | | | |
|---|---|---|---|
| 6,508,898 B1 * | 1/2003 | Rustad | B29D 30/0685 156/115 |
| 2005/0234194 A1 | 10/2005 | Saiga et al. | |
| 2013/0338330 A1 | 12/2013 | Nakagawa et al. | |
| 2017/0020491 A1 | 1/2017 | Ogawa | |
| 2018/0112112 A1 * | 4/2018 | Onishi | C08K 5/09 |
| 2018/0171139 A1 | 6/2018 | Yamada | |
| 2018/0208720 A1 | 7/2018 | Hasegawa et al. | |

FOREIGN PATENT DOCUMENTS

| | | |
|---|---|---|
| EP | 2935385 | 10/2015 |
| JP | 2011-79985 A | 4/2011 |
| JP | 2013-67757 A | 4/2013 |
| JP | 2018-90662 A | 6/2018 |
| WO | 2012/121291 A1 | 9/2012 |
| WO | 2014/098938 A1 | 6/2014 |
| WO | 2016/190131 A1 | 12/2016 |
| WO | 2017/010422 A1 | 1/2017 |

OTHER PUBLICATIONS

PCT International Preliminary Report on Patentability (Form PCT/IB/373) filed in PCT/JP2019/014588, with PCT Notification Concerning Transmittal of International Preliminary Report on Patentability (Form PCT/IB/326) dated Oct. 15, 2020.
PCT International Preliminary Report on Patentability (Form PCT/IB/373) filed in PCT/JP2019/014588, with PCT Notification of Transmittal of Translation of the International Preliminary Report on Patentability (Form PCT/IB/338) dated Oct. 15, 2020.
PCT International Preliminary Report on Patentability (Form PCT/IB/373) filed in PCT/JP2019/014590, with PCT Notification Concerning Transmittal of International Preliminary Report on Patentability (Form PCT/IB/326) dated Oct. 15, 2020.
PCT International Preliminary Report on Patentability (Form PCT/IB/373) filed in PCT/JP2019/014590, with PCT Notification of Transmittal of Translation of the International Preliminary Report on Patentability (Form PCT/IB/338) dated Oct. 15, 2020.
Yujin Liu, "Handbook of Polyurethane Raw Materials and Additives", Chemical Industry Press, Materials Science and Engineering Publishing Center, Beijin, Apr. 2005, p. 533, and its English translation.; Cited in Chinese Office Action dated Mar. 14, 2022 filed in Chinese Patent Application No. 201980022222.4.
International Search Report (ISR) dated Jul. 2, 2019 filed in PCT/JP2019/014590.

* cited by examiner

*Primary Examiner* — Robert S Loewe
(74) *Attorney, Agent, or Firm* — RANKIN, HILL & CLARK LLP

(57) ABSTRACT

A polyurethane gel material includes an aliphatic polyisocyanate (A) having an average functionality of 2.3 or more and 3.2 or less, a polyol (B) having an average functionality of 2.0 or more and 2.3 or less, and a plasticizer (C) having an ester group. The aliphatic polyisocyanate (A) contains an isocyanurate derivative of an aliphatic diisocyanate and/or an alcoholic modified isocyanurate derivative of an aliphatic diisocyanate. The polyol (B) contains a polyoxyalkylene (carbon number of 2 to 3) polyol having an ethylene oxide content of 30% by mass or less, and/or a polytetramethylene ether glycol. The polyol (B) has an average hydroxyl value of 30 mgKOH/g or more and 70 mgKOH/g or less. A ratio of the plasticizer (C) per 100 parts by mass of the polyol component (B) is 50 parts by mass or more and 400 parts by mass or less.

10 Claims, No Drawings

POLYURETHANE GEL MATERIAL, POLYURETHANE GEL, PSEUDO-BIOMATERIAL, AND PRODUCING METHOD OF POLYURETHANE GEL

TECHNICAL FIELD

The present invention relates to a polyurethane gel material, a polyurethane gel, a pseudo-biomaterial, and a method for producing a polyurethane gel.

BACKGROUND ART

Conventionally, polyurethane gels of low hardness have been used in the fields of vibration-proof and quake-isolation members, shock absorbing members, cushioning members, surface protection members, and the like.

Since flexibility is required for such a polyurethane gel, a plasticizer is usually added thereto. However, the plasticizer may bleed, resulting in a problem that the surface of the polyurethane gel is greasy.

Therefore, for example, as a polyurethane gel without containing a plasticizer, an ultra-low hardness thermosetting polyurethane elastomer forming composition obtained by reacting a nurate-type polyisocyanate (A) having an average functionality of 2.5 to 3.5 with a modified polytetramethylene glycol (B) having a number average molecular weight of 800 to 5000 at a NCO/OH equivalent ratio of (A) to (B) of below 1.0 and having an Asker C hardness of 50 or less has been proposed (ref: for example, Patent Document 1 below).

However, in the ultra-low hardness thermosetting polyurethane elastomer forming composition of Patent Document 1 described below, there is no bleeding of the plasticizer, while the pressure-sensitive adhesive properties (tackiness) of the surface is high, resulting in inconvenience in handleability. Therefore, it is required to suppress the bleeding of the plasticizer and to reduce the surface tackiness.

Therefore, it has been proposed to cover a polyurethane gel by a surface layer, and specifically, a polyurethane gel including a gel layer and a coating layer for covering the gel layer has been proposed (ref: for example, Patent Document 2 below). The gel layer is obtained by at least reacting an aliphatic polyisocyanate having an average functionality of above 2.0 with a polyol having an average functionality of 3.0 or less, and the coating layer is obtained by at least reacting an aliphatic diisocyanate and/or an alicyclic diisocyanate with a bifunctional active hydrogen compound.

CITATION LIST

Patent Document

Patent Document 1: Japanese Unexamined Patent Publication No. 2011-79985
Patent Document 2: International Publication WO2017/010422

SUMMARY OF THE INVENTION

Problem to be Solved by the Invention

On the other hand, in order to improve productivity of the polyurethane gel, it has been considered to remove a skin layer in the polyurethane gel described in Patent Document 2 described above.

In other words, there is a demand for the polyurethane gel capable of suppressing bleeding of the plasticizer and reducing the surface tackiness even without the skin layer.

In addition, curability, mechanical properties (elongation etc.), appropriate hardness, and the like are required for the polyurethane gel in accordance with the application.

The present invention provides a polyurethane gel material capable of suppressing bleeding of a plasticizer, reducing surface tackiness, and obtaining a polyurethane gel excellent in curability, mechanical properties, and hardness; a polyurethane gel obtained from the polyurethane gel material; a pseudo-biomaterial; and a method for producing a polyurethane gel.

Means for Solving the Problem

The present invention [1] includes a polyurethane gel material including an aliphatic polyisocyanate (A) having an average functionality of 2.3 or more and 3.2 or less, a polyol (B) having an average functionality of 2.0 or more and 2.3 or less, and a plasticizer (C) having an ester group, wherein the aliphatic polyisocyanate (A) contains an isocyanurate derivative of an aliphatic diisocyanate and/or an alcoholic modified isocyanurate derivative of an aliphatic diisocyanate, the polyol (B) contains a polyoxyalkylene (carbon number of 2 to 3) polyol having an ethylene oxide content of 30% by mass or less, and/or a polytetramethylene ether glycol, the polyol (B) has an average hydroxyl value of 30 mgKOH/g or more and 70 mgKOH/g or less, and a ratio of the plasticizer (C) per 100 parts by mass of the polyol component (B) is 50 parts by mass or more and 400 parts by mass or less.

The present invention [2] includes the polyurethane gel material described in the above-described [1], wherein the polyol (B) has an average functionality of 2.0.

The present invention [3] includes the polyurethane gel material described in the above-described [1] or [2], wherein the polyol (B) has an average hydroxyl value of 37 mgKOH/g or more and 56 mgKOH/g or less.

The present invention [4] includes the polyurethane gel material described in any one of the above-described [1] to [3], wherein the aliphatic polyisocyanate (A) has an average functionality of 2.3 or more and 3.0 or less.

The present invention [5] includes the polyurethane gel material described in any one of the above-described [1] to [4], wherein the aliphatic diisocyanate includes a pentamethylene diisocyanate and/or a hexamethylene diisocyanate.

The present invention [6] includes the polyurethane gel material described in any one of the above-described [1] to [5], wherein a ratio of the plasticizer (C) per 100 parts by mass of the polyol component (B) is 100 parts by mass or more and 200 parts by mass or less.

The present invention [7] includes the polyurethane gel material described in any one of the above-described [1] to [6], wherein the plasticizer (C) is cyclohexanedicarboxylic acid esters and/or adipic acid esters.

The present invention [8] includes a polyurethane gel being a reaction product of the polyurethane gel material described in any one of the above-described [1] to [7].

The present invention [9] includes the polyurethane gel described in the above-described [8], wherein in the polyurethane gel material, an equivalent ratio (NCO/hydroxyl group) of an isocyanate group in an aliphatic polyisocyanate (A) to a hydroxyl group in a polyol (B) is 0.8 or more and 1:2 or less.

The present invention [10] includes a pseudo-biomaterial including the polyurethane gel described in the above-described [8] or [9].

The present invention [11] includes a method for producing a polyurethane gel including a preparation step of preparing the polyurethane gel material described in any one of above-described [1] to [7] and a reaction step of reacting and curing the polyurethane gel material to obtain a polyurethane gel, wherein in the reaction step, an equivalent ratio (NCO/hydroxyl group) of an isocyanate group in an aliphatic polyisocyanate (A) to a hydroxyl group in a polyol (B) is 0.8 or more and 1.2 or less.

Effect of the Invention

According to the polyurethane gel material of the present invention, it is possible to obtain a polyurethane gel which suppresses bleeding of a plasticizer, can reduce surface tackiness, and is excellent in curability, mechanical properties, and hardness.

In addition, the polyurethane gel of the present invention suppresses bleeding of a plasticizer, can reduce surface tackiness, and is excellent in curability, mechanical properties, and hardness.

Further, according to the method for producing a polyurethane gel of the present invention, it is possible to obtain a polyurethane gel which suppresses bleeding of a plasticizer, can reduce surface tackiness, and is excellent in curability, mechanical properties, and hardness.

DESCRIPTION OF EMBODIMENTS

A polyurethane gel material of the present invention is a material which gels by a urethanization reaction to be described later and forms a polyurethane gel (described later). In other words, the polyurethane gel material is a raw material composition of a polyurethane gel (described later).

The polyurethane gel material contains an aliphatic polyisocyanate (A) having an average functionality of 2.3 or more and 3.2 or less, a polyol (B) having an average functionality of 2.0 or more and 2.3 or less, and a plasticizer (C) having an ester group. Preferably, the polyurethane gel material contains only an aliphatic polyisocyanate (A) having an average functionality of 2.3 or more and 3.2 or less, a polyol (B) having an average functionality of 2.0 or more and 2.3 or less, and a plasticizer (C) having an ester group.

A functional group of the aliphatic polyisocyanate (A) indicates an isocyanate group. The functional group of the polyol (B) indicates a hydroxyl group.

The aliphatic polyisocyanate (A) contains an isocyanurate derivative and/or an alcoholic modified isocyanurate derivative of an aliphatic diisocyanate, preferably, contains an alcoholic modified isocyanurate derivative.

Since the aliphatic polyisocyanate (A) has both an aliphatic hydrocarbon group and an isocyanurate group, it imparts appropriate flexibility to the polyurethane gel by the aliphatic hydrocarbon group, also imparts appropriate rigidity and polarity by the isocyanurate group, and can impart affinity to the plasticizer (C), and further, the average functionality can be adjusted within a range to be described later.

Examples of the aliphatic diisocyanate include trimethylene diisocyanate, 1,2-propylene diisocyanate, butylene diisocyanate (tetramethylene diisocyanate, 1,2-butylene diisocyanate, 2,3-butylene diisocyanate, 1,3-butylene diisocyanate), pentamethylene diisocyanate (PDI), hexamethylene diisocyanate (HDI), 2,4,4- or 2,2,4-trimethylhexamethylene diisocyanate, and 2,6-diisocyanatemethylcaproate.

These aliphatic diisocyanates may be used alone or in combination of two or more.

As the aliphatic diisocyanate, from the viewpoint of improvement of mechanical properties, preferably, a pentamethylene diisocyanate (PDI) and a hexamethylene diisocyanate (HDI) are used, and further, from the viewpoint of improvement of bleeding resistance, low tackiness, mechanical properties, and hardness, more preferably, a pentamethylene diisocyanate (PDI) is used.

In other words, when the pentamethylene diisocyanate (PDI) is used as the aliphatic diisocyanate, the polyurethane gel excellent in bleeding resistance, low tackiness, mechanical properties, and hardness can be obtained.

Then, the isocyanurate derivative of the aliphatic diisocyanate can be obtained by isocyanurating the above-described aliphatic diisocyanate by a known method.

More specifically, the isocyanurate derivative of the aliphatic diisocyanate can be obtained, for example, by reacting the aliphatic diisocyanate in the presence of a known isocyanuration catalyst (e.g., N-(2-hydroxypropyl)-N,N,N-trimethylammonium-2-ethylhexanoate etc.) and subjecting it to an isocyanuration reaction.

The reaction conditions in the isocyanuration reaction are not particularly limited and are appropriately set.

The alcoholic modified isocyanurate derivative of the aliphatic diisocyanate can be obtained by modifying the isocyanurate derivative of the aliphatic diisocyanate with alcohols.

The alcohols are not particularly limited, and examples thereof include aliphatic alcohols and aromatic alcohols. Preferably, aliphatic alcohols are used. Specific examples thereof include monohydric aliphatic alcohols such as methanol, ethanol, n-propanol, isopropanol, n-butanol, isobutanol (isobutyl alcohol), sec-butanol, tert-butanol, pentanol, hexanol, 2-ethyl hexanol, octanol, and decanol; dihydric aliphatic alcohols such as ethylene glycol, 1,2-propanediol, 1,3-propanediol, 1,3-butylene glycol 1,4-butylene glycol, 1,5-pentanediol, and 1,6-hexanediol; trihydric aliphatic alcohols such as glycerine and trimethylolpropane; and tetrahydric or more aliphatic alcohols such as tetramethylolmethane.

These alcohols may be used alone or in combination of two or more. As the alcohols, preferably, a monohydric aliphatic alcohol is used, more preferably, a monohydric aliphatic alcohol having carbon number of 1 to 4 is used, further more preferably, isobutanol (another name: isobutyl alcohol) is used.

As a method for modifying the isocyanurate derivative of the aliphatic diisocyanate with the alcohols, for example, a method for first reacting the aliphatic diisocyanate with the alcohols and then, subjecting the obtained reaction product to an isocyanuration reaction in the presence of an isocyanuration catalyst, and a method for first isocyanurating only the aliphatic diisocyanate and then, reacting the obtained polyisocyanurate with the alcohols are used.

Preferably, first, an aliphatic diisocyanate and alcohols are reacted, and then, an isocyanuration reaction is carried out in the presence of an isocyanuration catalyst.

In such a reaction, a mixing ratio of the aliphatic diisocyanate to the alcohols is appropriately set in accordance with the purpose and the application, and the mixing ratio of the alcohols per 100 parts by mass of the aliphatic diisocyanate is, for example, 0.1 parts by mass or more, preferably 0.5 parts by mass or more, more preferably 1.0 part by mass or more, and for example, 10 parts by mass or less, preferably 5 parts by mass or less, more preferably 2 parts by mass or less, further more preferably 1.5 parts by mass or less.

Further, the reaction conditions of the aliphatic diisocyanate and the alcohols are appropriately set in accordance with the purpose and the application.

The reaction of the aliphatic diisocyanate with the alcohols is a urethanization reaction and an allophanatization reaction, and an allophanate derivative of the aliphatic diisocyanate may be generated as a by-product. In other words, the isocyanurate derivative of the aliphatic diisocyanate modified by the alcohols may have both an isocyanurate group and an allophanate group.

In such a case, a mole ratio of the allophanate group in the alcoholic modified isocyanurate derivative of the aliphatic diisocyanate is less than that of the isocyanurate group, and specifically, the mole ratio of the allophanate group per 1 mol of the isocyanurate group is, for example, 0.05 mol or more, preferably 0.1 mol or more, more preferably 0.2 mol or more, and for example, below 1.0 mol, preferably 0.5 mol or less.

When the mole ratio of the allophanate group is within the above-described range, improvement in mechanical properties and heat resistance can be achieved.

The mole ratio of the allophanate group to the isocyanurate group can be determined in conformity with Examples to be described later.

In addition, in the above-described reaction, if necessary, for example, a known additive such as a storage stabilizer (o-toluenesulfonamide, p-toluenesulfonamide, etc.), a reaction terminator (benzoyl chloride etc.), an anti-blocking agent, a heat-resistant stabilizer, a light-resistant stabilizer, an ultraviolet absorber, an antioxidant, a defoaming agent, a mold release agent, a pigment, a dye, a lubricant, a filler, and a hydrolysis inhibitor can be further blended at an appropriate ratio.

Further, after completion of the above-described reaction, if necessary, the unreacted aliphatic diisocyanate can be also, for example, removed by a known method such as distillation including thin film distillation (Smith distillation) or extraction.

A content ratio of the unreacted aliphatic diisocyanate (isocyanate monomer concentration) with respect to the total amount of the reaction liquid obtained in the above-described reaction is, for example, 1% by mass or less, preferably 0.5% by mass or less.

Further, the aliphatic polyisocyanate (A) may further contain another derivative as long as it contains the isocyanurate derivative and/or the alcoholic modified isocyanurate derivative of the aliphatic diisocyanate.

The other derivative is s derivative of the aliphatic diisocyanate excluding the isocyanurate derivative and the alcoholic modified isocyanurate derivative of the aliphatic diisocyanate. Examples thereof include an allophanate derivative of an aliphatic diisocyanate, a uretdione derivative of an aliphatic diisocyanate, a urea derivative of an aliphatic diisocyanate, a carbodiimide derivative of an aliphatic diisocyanate, a biuret derivative of an aliphatic diisocyanate, an oxadiazine triune derivative of an aliphatic diisocyanate, a uretonitnine derivative of an aliphatic diisocyanate, and a polyol modified product of an aliphatic diisocyanate.

These other derivatives may be used alone or in combination of two or more.

As the other derivative, preferably, an allophanate derivative of an aliphatic diisocyanate is used.

The allophanate derivative of the aliphatic diisocyanate can be obtained by subjecting the above-described aliphatic diisocyanate and the above-described alcohols (preferably, the monohydric aliphatic alcohol) to a urethanization reaction, and then, subjecting the reacted product to an allophanatization reaction in the presence of a known allophanatization catalyst (e.g., bismuth octylate, tris(2-ethylhexanoic acid) bismuth, etc.). The reaction conditions in the urethanization reaction and the allophanatization reaction are not particularly limited and are appropriately set.

A content ratio of the other derivative (preferably, an allophanate derivative) is appropriately set in accordance with the purpose and the application as long as it does not damage the excellent effect of the present invention. The content ratio of the other derivative per 100 parts by mass of the total amount of the aliphatic polyisocyanate (A) is, for example, 0 part by mass or more, and for example, 50 parts by mass or less, preferably 40 parts by mass or less, more preferably 20 parts by mass or less.

Further, the aliphatic polyisocyanate (A) may contain an aliphatic polyisocyanate monomer, if necessary.

An example of the aliphatic polyisocyanate monomer includes the above-described aliphatic diisocyanate (bifunctional aliphatic polyisocyanate monomer).

These aliphatic polyisocyanate monomers may be used alone or in combination of two or more.

A content ratio of the aliphatic polyisocyanate monomer is appropriately set in accordance with the purpose and the application as long as it does not damage the excellent effect of the present invention. The content ratio of the aliphatic polyisocyanate monomer per 100 parts by mass of the total amount of the aliphatic polyisocyanate (A) is, for example, 0 part by mass or more, and for example, 50 parts by mass or less, preferably 40 parts by mass or less, more preferably 20 parts by mass or less.

Then, in the aliphatic polyisocyanate (A), a ratio of the isocyanurate derivative and/or the alcoholic modified isocyanurate derivative of the aliphatic diisocyanate, the other derivative, and the aliphatic polyisocyanate monomer is appropriately adjusted so that the average functionality of the aliphatic polyisocyanate (A) is within a range of 2.3 to 3.2 as long as it does not damage the excellent effect of the present invention.

More specifically, the ratio of the isocyanurate derivative and/or the alcoholic modified isocyanurate derivative of the aliphatic diisocyanate per 100 parts by mass of the total amount of the aliphatic polyisocyanate (A) is, for example, 50 parts by mass or more, preferably 60 parts by mass or more, more preferably 80 parts by mass or more, and for example, 100 parts by mass or less. The ratio of the other derivative and/or the aliphatic polyisocyanate monomer per 100 parts by mass of the total amount of the aliphatic polyisocyanate (A) is, for example, 0 part by mass or more, and for example, 50 parts by mass or less, preferably 40 parts by mass or less, more preferably 20 parts by mass or less.

In addition, from the viewpoint of bleeding resistance and mechanical properties, preferably, the aliphatic polyisocyanate (A) consists of an isocyanurate derivative and/or an alcoholic modified isocyanurate derivative of an aliphatic diisocyanate, more preferably, an alcoholic modified isocyanurate derivative of an aliphatic diisocyanate, further more preferably, an alcoholic modified isocyanurate derivative of a pentamethylene diisocyanate (the inclusion of an allophanate derivative (allophanate derivative without containing an isocyanurate group) and a uretdione derivative by-produced at the time of producing an isocyanurate derivative is allowed).

From the viewpoint of curability and mechanical properties, an average functionality of the aliphatic polyisocyanate (A) is 2.3 or more, preferably 2.5 or more, more preferably 2.6 or more, further more preferably 2.7 or more, and 3.2 or less, preferably 3.1 or less, more preferably 3.0 or less, and further more preferably 2.9 or less.

That average functionality of the aliphatic polyisocyanate (A) is calculated in conformity with Examples to be described later.

Further, the isocyanate group concentration of the aliphatic polyisocyanate (A) is, for example, 20.0% by mass or more, preferably 22.0% by mass or more, and for example, 30.0% by mass or less, preferably 25.0% by mass or less, more preferably 24.6% by mass or less.

The polyol (B) contains a polyoxyalkylene (carbon number of 2 to 3) polyol having an ethylene oxide content of 30% by mass or less, and/or a polytetramethylene ether glycol. When the polyol (B) contains these, a flexible polyurethane gel can be obtained.

The polyoxyalkylene (carbon number of 2 to 3) polyol is, for example, an addition polymer of an alkylene oxide having a carbon number of 2 to 3 using a low molecular weight polyol, a known low molecular weight polyamine, or the like as an initiator.

A low molecular weight polyol is, for example, a compound having 2 or more hydroxyl groups in a molecule and having a molecular weight of 50 or more and 400 or less. Examples thereof include dihydric alcohols such as ethylene glycol, propylene glycol, 1,3-propanediol, 1,4-butylene glycol, 1,3-butylene glycol, 1,2-butylene glycol, 1,5-pentanedial, 1,6-hexanediol, neopentyl glycol, 3-methyl-1,5-pentanediol, 2,2,2-trimethylpentanediol, 3,3-dimethylolheptane, alkane (C7-20) diol, 1,3- or 1,4-cyclohexanedimethanol and mixtures thereof, 1,3- or 1,4-cyclohexanediol and mixtures thereof, hydrogenated bisphenol A, 1,4-dihydroxy-2-butene, 2,6-dimethyl-1-octen-3,8-diol, bisphenol A, diethylene glycol, triethylene glycol, and dipropylene glycol; trihydric alcohols such as glycerine, trimethylolpropane, and triisopropanolamine; and tetrahydric alcohols such as tetramethylolmethane pentaerythritol) and diglycerine. These low molecular weight polyols may be used alone or in combination of two or more. As the low molecular weight polyol, preferably, a dihythic alcohol and a trihydric alcohol are used, more preferably, a dihydric alcohol is used.

The polyoxyalkylene (carbon number of 2 to 3) polyol is obtained as a polyoxyalkylene polyol having an average functionality in accordance with a functionality of the initiator. For example, when an initiator having a functionality of 2 is used, a polyoxyalkylene diol having an average functionality of 2 is obtained, and when an initiator having a functionality of 3 is used, a polyoxyalkylene triol having an average functionality of 3 is obtained.

Specific examples of the alkylene oxide having a carbon number of 2 to 3 include ethylene oxide and propylene oxide. An addition format of the alkylene oxide is not particularly limited, and may be either a block or a random.

In the polyoxyalkylene (carbon number of 2 to 3) polyol, from the viewpoint of bleeding resistance, an ethylene oxide content is 30% by mass or less, preferably 20% by mass or less, more preferably 10% by mass or less, further more preferably 5% by mass or less, particularly preferably 0% by mass.

In other words, examples of the polyoxyalkylene (carbon number of 2 to 3) polyol include an addition homopolymer of the propylene oxide (polyoxypropylene polyol) and an addition copolymer of the ethylene oxide and the propylene oxide (random and/or block copolymer). In addition, in the addition copolymer of the ethylene oxide and the propylene oxide, the ethylene oxide content is within the above-described range.

The ethylene oxide content can be calculated from a charging ratio in the production of the polyoxyalkylene (carbon number of 2 to 3) polyol.

These polyoxyalkylene (carbon number of 2 to 3) polyols may be used alone or in combination of two or more.

As the polyoxyalkylene (carbon number of 2 to 3) polyol, from the viewpoint of bleeding resistance, preferably, a polyoxypropylene polyol is used.

Examples of the polytetramethylene ether glycol include a ring opening polymer (crystalline polytetramethylene ether glycol) obtained by cationic polymerization of a tetrahydrofuran, and an amorphous polytetramethylene ether glycol obtained by copolymerizing the above-described dihydric alcohol with a polymerization unit such as tetrahydrofuran. The crystallinity indicates solid at normal temperature (25° C.), and the amarphousness indicates liquid at normal temperature (25° C.).

The amorphous polytetramethylene ether glycol can be obtained, for example, as a copolymer (tetrahydrofuran/alkyl substituted tetrahydrofuran (mole ratio)=15/85 to 85/15) of a tetrahydrofuran and an alkyl substituted tetrahydrofuran (e.g., 3-methyltetrahydrofuran etc.) and a copolymer (tetrahydrofuran/branched glycol (mole ratio)=15/85 to 85/15) of a tetrahydrofuran and a branched glycol (e.g., neopentyl glycol etc.).

Further, as the amorphous polytetramethylene ether glycol, a commercially available product can be used, and examples of such a commercially available product include the "PTXG" series manufactured by ASAHI KASEI FIBERS CORPORATION and the "PTG-L" series manufactured by Hodogaya Chemical Co., Ltd.

Also, a plant-derived polytetramethylene ether glycol using a tetrahydrofuran produced based on a plant-derived raw material such as furfural as a starting material can be used.

As the polytetramethylene ether glycol, from the viewpoint of mechanical properties and hardness, preferably, an amorphous polytetramethylene ether glycol is used, and from the viewpoint of bleeding resistance and low tackiness, preferably, a crystalline polytetramethylene ether glycol is used.

As the polyol (B), from the viewpoint of bleeding resistance, mechanical properties, and hardness, preferably, a polyoxypropylene glycol and a crystalline polytetramethylene ether glycol are used, more preferably, a polyoxypropylene glycol is used.

The polyol (B) may contain another polyol as long as it contains the above-described polyoxyalkylene (carbon number of 2 to 3) polyol and/or the above-described polytetramethylene ether glycol.

Examples of the other polyol include the above-described low molecular weight polyol and a known high molecular weight polyol (excluding a polyoxyalkylene (carbon number of 2 to 3) polyol, and the above-described polytetramethylene ether glycol). The high molecular weight polyol is a compound having a molecular weight (number average molecular weight in terms of polystyrene with GPC measurement) of above 400 and having two or more hydroxyl groups. Examples thereof include polyester polyol, polycarbonate polyol, polyurethane polyol, epoxy polyol, vegetable oil polyol, polyolefin polyol, acrylic polyol, and vinyl monomer-modified polyol.

These other polyols may be used alone or in combination of two or more.

In the polyol (B), a content ratio of the other polyol is appropriately adjusted as long as it does not damage the excellent effect of the present invention.

From the viewpoint of bleeding resistance, low tackiness, mechanical properties, and hardness, the polyol (B) preferably does not contain the other polyol and consists of a polyoxyalkylene (carbon number of 2 to 3) polyol and/or a polytetramethylene ether glycol, more preferably, consists of a polyoxyalkylene (carbon number of 2 to 3) polyol.

In addition, these polyols (B) are used alone or in combination of two or more so that its average functionality and an average hydroxyl value (OH value) are within a range to be described later.

Specifically, from the viewpoint of curability, the average functionality of the polyol (B) is 2.0 or more, and from the viewpoint of mechanical properties, the average functionality of the polyol (B) is 2.3 or less, preferably 2.2 or less, more preferably 2.1 or less. From the viewpoint of bleeding resistance and low tackiness, particularly preferably, the average functionality of the polyol (B) is 2.0.

In addition, from the viewpoint of bleeding resistance and low tackiness, the average hydroxyl value (OH value) of the polyol (B) is 30 mgKOH/g or more, preferably 35 mgKOH/g or more, more preferably 37 mgKOH/g or more, further more preferably 40 mgKOH/g or more, and 70 mgKOH/g or less, preferably 65 mgKOH/g or less, more preferably 56 mgKOH/g or less.

The average functionality of the polyol (B) is calculated from the mixing formulation of the charging, and the hydroxyl value of the polyol is measured in conformity with the description of JIS K 1557-1 (2007).

In addition, from the viewpoint of curability, mechanical properties, bleeding resistance, and low tackiness, the number average molecular weight (the number average molecular weight calculated from the average functionality and the hydroxyl value) of the polyol (B) is, for example, 1600 or more, preferably 1800 or more, more preferably 2000 or more, and for example, 4300 or less, preferably 3500 or less, more preferably 3000 or less, further more preferably 2500 or less.

When the hydroxyl value and the number average molecular weight are within the above-described range, hydrophobicity can be imparted to the obtained polyurethane gel, and affinity with the plasticizer (C) can be improved to suppress bleeding.

In the polyurethane gel material, a content ratio of the aliphatic polyisocyanate (A) and the polyol (B) is adjusted so that an equivalent ratio (NCO/hydroxyl group) of the isocyanate group in the aliphatic polyisocyanate (A) to the hydroxyl group in the polyol (B) is 0.8 to 1.2.

The plasticizer (C) has an ester group. By using the plasticizer (C) having an ester group, it is possible to improve the curability as compared with a case where a plasticizer without containing an ester group (e.g., chloroparaffin etc.) is used.

Further, when the plasticizer (C) has an ester group, the affinity for a urethane group obtained by a reaction of the aliphatic polyisocyanate (A) with the polyol (B) can be obtained.

More specifically, examples of the plasticizer having an ester group include cyclohexanedicarboxylic acid esters, phthalic acid esters, isophthalic acid esters, tetrahydrophthalic acid esters, adipic acid esters, azelaic acid esters, sebacic acid esters, fumaric acid esters, maleic acid esters, trimellitic acid esters, pyromellitic acid esters, citric acid esters, itaconic acid esters, oleic acid esters, ricinoleic acid esters, stearin, acid esters, other fatty acid esters, and phosphoric acid esters.

Examples of the cyclohexanedicarboxylic acid esters include dimethylcyclohexane-1,2-dicarboxylate, diethylcyclohexane-1,2-dicarboxylate, dibutylcyclohexane-1,2-dicarboxylate, di(2-ethylhexyl)cyclohexane-1,2-dicarboxylate, dioctylcyclohexane-1,2-dicarboxylate, diisodecylcyclohexane-1,2-dicarboxylate, diisononylcyclohexane-1,2-dicarboxylate, dimethylcyclohexane-1,3-dicarboxylate, diethylcyclohexane-1,3-dicarboxylate, dibutylcyclohexane-1,3-dicarboxylate, di(3-ethylhexyl)cyclohexane-1,3-dicarboxylate, dioctylcyclohexane-1,3-dicarboxylate, diisodecylcyclohexane-1,3-dicarboxylate, diisononylcyclohexane-1,3-dicarboxylate, dimethylcyclohexane-1,4-dicarboxylate, diethylcyclohexane-1,4-dicarboxylate, dibutylcyclohexane-1,4-dicarboxylate, di(4-ethylhexyl)cyclohexane-1,4-dicarboxylate, dioctylcyclohexane-1,4-dicarboxylate, diisodecylcyclohexane-1,4-dicarboxylate, diisononylcyclohexane-1,4-dicarboxylate, 3,4-epoxy-dimethylcyclohexane-1,2-dicarboxylate, 3,4-epoxy-diethylcyclohexane-1,2-dicarboxylate, 3,4-epoxy-dibutylcyclohexane-1,2-dicarboxylate, 3,4-epoxy-di(2-ethylhexyl)cyclohexane-1,2-dicarboxylate, 4,5-epoxy-dimethylcyclohexane-1,2-dicarboxylate, 4,5-epoxy-diethylcyclohexane-1,2-dicarboxylate, 4,5-epoxy-dibutylcyclohexane-1,2-dicarboxylate, and 4,5-epoxy-di(2-ethylhexyl)cyclohexane-1,2-dicarboxylate.

Examples of the phthalic acid esters include dibutyl phthalate, isobutyl phthalate, diheptyl phthalate, di-(2-ethylhexyl) phthalate, di-n-octyl phthalate, dinonyl phthalate, diisononyl phthalate, diisodecyl phthalate, diundecyl phthalate, ditridecyl phthalate, dicyclohexyl phthalate, and diphenyl phthalate.

Examples of the isophthalic acid esters include di-(2-ethylhexyl) isophthalate and diisooctyl isophthalate.

Examples of the tetrahydroph haft acid esters include di-(2-ethylhexyl) tetrahydrophthalate.

Examples of the adipic acid esters include di-(2-ethylhexyl) adipate, dibutoxyethyl adipate, and diisononyl adipate.

Examples of the azelaic acid esters include di-n-hexylazelate and di-(2-ethylhexyl) azelate.

Examples of the sebacic acid esters include di-n-butylsebacate.

Examples of the fumaric acid esters include di-n-butylfumarate and di-(2-ethylhexyl) fumarate.

Examples of the maleic acid esters include di-n-butylmaleate and di-(2-ethylhexyl) maleate.

Examples of the trimellitic acid esters include tri-(2-ethylhexyl) trimellitate, tri-n-octyltrimellitate, and triisooctyltrimellitate.

Examples of the pyromellitic acid esters include tetra-(2-ethylhexyl) pyromellitate and tetra-n-octylpyromellitate.

Examples of the citric acid esters include tri-n-butylcitrate and acetyltributylcitrate.

Examples of the itaconic acid esters include dimethyl itaconate, diethyl itaconate, dibutyl itaconate, and di-(2-ethylhexyl) itaconate.

Examples of the oleic acid esters include glyceryl monooleate and diethylene glycol monooleate.

Examples of the ricinoleic acid esters include glyceryl monoricinoleate and diethylene glycol monoricinoleate.

Examples of the stearic acid esters include glycerine monostearate and diethylene glycol distearate.

Examples of the other fatty acid esters include diethylene glycol dipelargonate and pentaerythritol fatty acid ester.

Examples of the phosphoric acid esters include tributoxyethyl phosphate, triphenyl phosphate, tricresyl phosphate, diphenyl decyl phosphate, and diphenyl octyl phosphate.

These plasticizers (C) having an ester group may be used alone or in combination of two or more.

As the plasticizer (C) having an ester group, from the viewpoint of curability and bleeding resistance, preferably, cyclohexanedicarboxylic acid esters, phthalic acid esters, and adipic acid esters are used, more preferably, cyclohexanedicarboxylic acid esters, adipic acid esters, and combinations of these are used, further more preferably, cyclohexanedicarboxylic acid esters are used.

A boiling point of the plasticizer (C) is, for example, 180° C. or more, preferably 200° C. or more, more preferably 220° C. or more. The upper limit of the boiling point is about 400° C. from the viewpoint of industrial availability.

In the polyurethane gel material, from the viewpoint of bleeding resistance, low tackiness, and hardness, a content ratio of the plasticizer (C) having an ester group per 100 parts by mass of the polyol component (B) is 50 parts by mass or more, preferably 80 parts by mass or more, more preferably 100 parts by mass or more, further more preferably 150 parts by mass or more, and 400 parts by mass or less, preferably 300 parts by mass or less, more preferably 250 parts by mass or less, further more preferably 200 parts by mass or less.

According to such a polyurethane gel material, it is possible to obtain the polyurethane gel which suppresses the bleeding of the plasticizer, can reduce the surface tackiness, and is excellent in curability, mechanical properties, and hardness.

When the content ratio of the plasticizer (C) is relatively large, preferably, the polyol (B) having a relatively high average hydroxyl value is used.

For example, when the content ratio of the plasticizer (C) is 300 parts by mass or more per 100 parts by mass of the polyol component (B), the average hydroxyl value of the polyol (B) is preferably 40 mgKOH/g or more, more preferably 50 mgKOH/g or more, more preferably 55 mgKOH/g or more, and 70 mgKOH/g or less.

Then, in order to obtain the polyurethane gel, first, the above-described polyurethane gel material is prepared (preparation step); then, the aliphatic polyisocyanate (A) and the polyol (B) are put into a predetermined metal mold together with the plasticizer (C) having an ester group, and preferably, the obtained mixture is subjected to a urethanization reaction (solvent-free reaction, bulk polymerization) in the absence of a solvent (reaction step).

In the urethanization reaction, for example, a known method such as a one-shot method and a prepolymer method is used, preferably, a one-shot method is used.

In the one-shot method, for example, the aliphatic polyisocyanate (A) and the polyol (B) are formulated (mixed) so that an equivalent ratio (NCO/hydroxyl group) of the isocyanate group in the aliphatic polyisocyanate (A) to the hydroxyl group in the polyol (B) is 0.8 or more, preferably 0.9 or more, and 1.2 or less, preferably 1.1 or less, more preferably 1.05 or less, and then, the obtained mixture is subjected to a curing reaction at, for example, room temperature to 120° C., preferably at room temperature to 100° C., for, for example, from 5 minutes to 72 hours, preferably from 2 to 10 hours. The curing temperature may be a constant temperature, or may be raised or cooled in stages.

When the equivalent ratio (NCO/hydroxyl group) of the isocyanate group in the aliphatic polyisocyanate (A) to the hydroxyl group in the polyol (B) is within the above-described range, both the flexibility and the shape-retaining properties (rigidity) of the polyurethane gel can be achieved, while the bleeding of the plasticizer (C) is suppressed.

In addition, in the above-described reaction, if necessary, a known urethanization catalyst such as amines and an organic metal compound can be, for example, added.

Examples of the amines include tertiary amines such as triethylamine, triethylenediamine, bis-(2-dimethylaminoethyl) ether, and N-methylmorpholine; quaternary ammonium salts such as tetraethylhydroxylammonium; and imidazoles such as imidazole and 2-ethyl-4-methylimidazole.

Examples of the organic metal compound include organic tin compounds such as tin acetate, tin octylate, tin oleate, tin laurate, dibutyltin diacetate, dimethyltin dilaurate, dibutyltin dilaurate, dibutyltin dimercaptide, dibutyltin maleate, dibutyltin dilaurate (dibutyltin dilaurate (IV)), dibutyltin dineodecanoate, dioctyltin dimercaptide, dioctyltin dilaurate, and dibutyltin dichloride; organic lead compounds such as lead octanoate and lead naphthenate; organic nickel compounds such as nickel naphthenate; organic cobalt compounds such as cobalt naphthenate; organic copper compounds such as copper octenate; and organic bismuth compounds such as bismuth octylate and bismuth neodecanoate.

Further, examples of the urethanization catalyst include potassium salts such as potassium carbonate, potassium acetate, and potassium octylate.

These urethanization catalysts may be used alone or in combination of two or more.

As the urethanization catalyst, preferably, an organic metal compound is used, more preferably, an organic tin compound is used, further more preferably, dibutyltin dilaurate (dibutyltin dilaurate (IV)) is used.

The timing of addition of the urethanization catalyst is not particularly limited, and may be, for example, added in advance to both or either of the aliphatic polyisocyanate (A) and the polyol (B), may be added simultaneously with the formulation thereof, and further, may be added separately after blending them.

Further, an addition ratio of the urethanization catalyst is not particularly limited, and is appropriately set in accordance with the purpose and the application.

In addition, in the above-described reaction, if necessary, a known additive such as a storage stabilizer (o-toluenesulfonamide, p-toluenesulfonamide, etc.), an anti-blocking agent, a heat-resistant stabilizer, a light-resistant stabilizer, an ultraviolet absorber, an antioxidant, a defoaming agent, a mold release agent, a pigment, a dye, a lubricant, a filler, and a hydrolysis inhibitor can be, for example, further blended at an appropriate ratio.

The timing of addition of the additive is not particularly limited, and may be, for example, added in advance to both or either of the aliphatic polyisocyanate (A) and the polyol (B), may be added simultaneously with the formulation thereof, and further, may be added separately after blending them. Further, an addition ratio of the additive is not particularly limited, and is appropriately set in accordance with the purpose and the application.

Such a polyurethane gel contains a polyurethane which is a reaction product of the aliphatic polyisocyanate (A) and the polyol (B), and the plasticizer (C), has high viscosity due to the higher order structure (three dimensional network) of the polyurethane, loses fluidity due to the inclusion of the plasticizer (C) in the polyurethane, and becomes a solid state as a whole of the system.

A shear elastic modulus at 25° C. of the polyurethane gel is $1\times10^3$ to $1\times10^7$ Pa. The shear elastic modulus is measured with a solid viscoelasticity measurement device.

Such a polyurethane gel includes the plasticizer (C) having an ester group at a specific ratio in a higher order structure (three dimensional network) of the polyurethane formed by a reaction of the aliphatic polyisocyanate (A) having a specific average functionality with the polyol (B) having a specific average functionality. As a result, the plasticizer (C) is confined in the three dimensional network. As a result, the polyurethane gel can achieve both suppression of the bleeding resistance and reduction of the surface tackiness.

In other words, since the above-described polyurethane gel is obtained from the above-described polyurethane gel material, the bleeding of the plasticizer can be suppressed, the surface tackiness can be reduced, and the curability, the mechanical properties, and the hardness are excellent.

Further, according to the above-described method for producing a polyurethane gel, it is possible to obtain the polyurethane gel which suppresses the bleeding of the plasticizer, can reduce the surface tackiness, and is excellent in curability, mechanical properties, and hardness.

A size of the polyurethane gel is set in accordance with the type of the metal mold to be used, and the like, and the thickness thereof is, for example, 0.03 mm or more, preferably 0.05 mm or more, and for example, 500 mm or less, preferably 400 mm or less.

Also, the above-described polyurethane gel may be also, for example, coated on a substrate such as leather, artificial or synthetic leather, nonwoven fabric, felt, sheet, film, or the like.

Specifically, the polyurethane gel is an ultra-low hardness polyurethane elastomer, and the Asker C hardness (JIS K 7312 (1996)) thereof is, for example, 0 or more, and for example, 40 or less, preferably 30 or less, more preferably 20 or less, further more preferably 15 or less, further more preferably 12 or less, particularly preferably 10 or less.

When the Asker C hardness is within the above-described range, especially 40 or less, it can be particularly preferably used as a gel with a feel, elasticity and flexibility that is close to human skin.

Further, such a polyurethane gel can be also further used by being encapsulated in a fabric such as cotton, silk, and synthetic fibers, a natural leather, a synthetic leather, paper, a nonwoven fabric, a resin film, a flexible foam, or the like.

The polyurethane gel can be preferably used as vibration-proof and quake-isolation members, shock absorbing members, cushioning members, surface protection members, cushioning, elbow rests, arm rests, switches, robotic components, robotic skin, manikins, members of mobility, pads, clothing components, aircraft components, cosmetics, medical devices, care and clothing materials such as diapers and floor misalignment prevention materials, wearable materials, eyewears such as frames, ear and nose pads of eyewear, earphones, headphones, grips and other sporting components, toys, playground equipment, protectors such as helmets, furniture, flexible sensors, sheets, flexible rods, nonwoven fabrics, composite materials with felt, shoe soles, shoe friction prevention, actuators, pseudo-biomaterials, and the like. Among all, the polyurethane gel can be preferably used as pseudo-biomaterials.

Since the polyurethane gel of the present invention has a touch, elasticity, and flexibility close to various organs and various internal organs constituting a human body in particular, and tissues constituting them, it is preferably used as a pseudo-biomaterial or the like in a medical field, a healthcare field, or the like.

More specifically, the pseudo-biomaterial made from the above-described polyurethane gel is formed as pseudo-biological models of cartilage and joints constituting a skeletal system; muscle, skeletal muscle, smooth muscle, and cardiac muscle constituting a muscular system; heart and blood constituting a circulatory system; upper airway, lower airway, and lung constituting a respiratory system; skin, ear, and nose constituting a sensory system; oral cavity, pharynx, esophagus, stomach, small intestine, large intestine, anal canal, anal, digestive gland, liver, biliary gland, and pancreas constituting a digestive system; kidney, renal pelvis, urinary tract, urinary bladder, and urethra constituting a urinary system; testis, prostate, seminal vesicle, penis, ovary, oviduct, uterus, and vagina constituting a genital organ; hypothalamus, pituitary, thyroid, accessory thyroid, adrenal, pancreas, testis, and ovary constituting an endocrine system; and brain, spinal cord, cerebrospinal nerve, and autonomic nerve constituting a nervous system. For example, the pseudo-biomaterial is preferably used as pseudo-biological models for training in various types of medical surgeries and pseudo-biological models for training in various types of inspections (ultrasonography, CT scan, etc.), pseudo-biological models in telemedicine and medical treatment, wearable equipment and terminal equipment in the field of health care, and as exhibition samples, equipment for education, toys, and the like.

EXAMPLES

Next, the present invention is described based on Production Examples, Examples, and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

The measurement methods used in the respective Production Examples, the respective Examples, and the respective Comparative Examples are described below.

1. Measurement Method

<Isocyanate Group Concentration (Unit: % by mass), Conversion Rate of Isocyanate Group (Unit: % by Mass)>

By using a potentiometric titrator (manufactured by KYOTO ELECTRONICS MANUFACTURING CO., LTD., model number: AT-510), the isocyanate group concentration (isocyanate group content ratio) was measured by a toluene/dibutylamine hydrochloric acid method in conformity with JIS K-1603-1 (2007), and a conversion rate of an isocyanate group of a measurement sample was calculated by the following formula.

Conversion rate of isocyanate group=100−(isocyanate group concentration in reaction liquid mixture after completion of reaction/isocyanate group concentration in reaction liquid before reaction×100)

<Isocyanate Monomer Concentration (Unit: % by Mass)>

The concentration of an unreacted isocyanate monomer (pentamethylene diisocyanate monomer or hexamethylene diisocyanate monomer) was calculated by using a pentamethylene diisocyanate produced in the same manner as in Example 1 in International Publication WO2012/121291 or a commercially available hexamethylene diisocyanate as a standard substance, being labelled with a dibenzylamine, and using a calibration curve prepared from the area values of chromatogram obtained under the following HPLC measurement conditions.

Device: Prominence (manufactured by Shimadzu Corporation)
Pumping: LC-20AT
Degasser: DGU-20A3
Autosampler: SIL-20A
Column thermostat: COT-20 A
Detector: SPD-20A
Column: SHISEIDO SILICA SG-120
Column temperature: 40° C.
Eluent: n-hexane/methanol/1,2-dichloroethane=90/5/5 (volume ratio)
Flow rate: 0.2 mL/min
Detecting method: UV 225 nm <Viscosity (Unit: mPa·s)>

The viscosity of the measurement sample was measured at 25° C. in conformity with a cone plate viscometer method of JIS K5600-2-3 (2014) by using an E-type viscometer TV-30 (rotor angle: 1°34', rotor radius: 24 cm) manufactured by TOKI SANGYO CO., LTD. The number of revolutions of the cone plate at the time of measurement was sequentially changed between 100 rpm and 2.5 rpm as the viscosity increased.

<Mole Ratio of Allophanate Group to Isocyanurate Group by $^1$H-NMR>

The $^1$H-NMR was measured with the following device and conditions, and a content ratio (mole ratio of allophanate group/isocyanurate group) of the allophanate group to 1 mol of the isocyanurate group in the aliphatic polyisocyanate was calculated by the following formula. As a reference of chemical shift ppm, a tetramethylsilane (0 ppm) in $D^6$-DMSO solvent was used.

Device: JNM-AL400 (manufactured by JEOL Ltd.)
Conditions: measurement frequency: 400 MHz, solvent: $D^6$-DMSO, solute concentration: 5% by mass
Assigned peak (6H) of proton of isocyanurate group (methylene group ($CH_2$ group) directly bonded to isocyanurate group): 3.8 ppm
Assigned peak (1H) of proton of allophanate group (NH group in allophanate group): 8.3 to 8:7 ppm.
Allophanate group/isocyanurate group (mole ratio)=integrated value of assigned peak of proton of allophanate group/(integrated value of assigned peak of proton of isocyanurate group/6)

<Average Number of Isocyanate Group (Average Functionality)>

An average number of the isocyanate group of the aliphatic polyisocyanate was calculated from the isocyanate group concentration, the solid content concentration (NV), and a number average molecular weight of gel permeation chromatography measured by the following device and conditions according to the following formula.

Average number of isocyanate group=A/B×C/42.02

(wherein A represents the isocyanate group concentration, B represents the solid content concentration, and C represents a number average molecular weight.)

Device: HLC-8220GPC (manufactured by TOSOH CORPORATION)
Column: series connection of TSKgelG1000HXL, TSKgelG2000HXL, and TSKgelG3000HXL (manufactured by TOSOH CORPORATION)
Detector: differential refractometer
Measurement Conditions
Injection volume: 100 μm
Eluent: tetrahydrofuran
Flow rate: 0.8 mL/min
Temperature: 40° C.
Calibration curve: standard polyethylene oxide in a rage of 106 to 22450 (manufactured by TOSOH CORPORATION, trade name: TSK standard polyethylene oxide)

<Average Number of Hydroxyl Group (Average Functionality)>

A hydroxyl value was defined as the number of mg of potassium hydroxide corresponding to a hydroxyl group in 1 g of a polyoxyalkylene polyol. The hydroxyl value of the polyol was measured in conformity with "hydroxyl value" of Section 6.4 of JIS K1557 (2007).

2. Materials (1) Aliphatic Polyisocyanate (A)

Preparation Example 1 (Isocyanate (a-1) (Alcoholic Modified Isocyanurate Derivative of PDI))

A four-neck flask equipped with a thermometer, a stirring device, a reflux tube, and a nitrogen introducing tube, was charged with 500 parts by mass of pentamethylene diisocyanate produced in the same manner as in Example 1 in the specification of International Publication WO2012/121291 (hereinafter, referred to as PDI), 6.9 parts by mass of isobutyl alcohol, 0.3 parts by mass of 2,6-di(tert-butyl)-4-methylphenol, and 0.3 parts by mass of tris(tridecyl) phosphite to be reacted at 80° C. for 2 hours.

Then, 0.05 parts by mass of N-(2-hydroxypropyl)-N,N,N-trimethylammonium-2-ethylhexanoate was blended as an isocyanuration catalyst. The isocyanate group concentration was measured, and the reaction was continued until its concentration reached 48.3% by mass (that is, conversion rate of 10% by mass). When a predetermined conversion rate (conversion rate of 10% by mass) was reached after 20 minutes, 0.12 parts by mass of o-toluenesulfonamide was added thereto. The obtained reaction liquid mixture was passed through a thin film distillation device (temperature: 150° C., vacuum degree: 0.093 kPa) to remove unreacted pentamethylene diisocyanate monomer, and further, 0.02 parts by mass of o-toluenesulfonamide and 0.003 parts by mass of benzoyl chloride were added to 100 parts by mass of the obtained residue to obtain an alcoholic modified isocyanurate derivative of PDI. This was referred to as an isocyanate (a-1).

In the isocyanate (a-1), the average number of the isocyanate group was 2.8, the isocyanate monomer concentration was 0.4% by mass, the isocyanate group concentration was 23.4% by mass, and the viscosity at 25° C. was 950 mPa·s.

Further, the mole ratio of the allophanate group to the isocyanurate group by $^1$H-NMR measurement was an allophanate group/isocyanurate group=33.0/100.

Preparation Example 2 (Isocyanate (a-2) (Alcoholic Modified Isocyanurate Derivative of PDI))

A four-neck flask equipped with a thermometer, a stirring device, a reflux tube, and a nitrogen introducing tube was charged with 500 parts by mass of PDI, 0.5 parts by mass of isobutyl alcohol, 0.3 parts by mass of 2,6-di(tert-butyl)-4-methylphenol, and 0.3 parts by mass of tris(tridecyl) phosphite to be reacted at 80° C. for 2 hours.

Then, 0.05 parts by mass of N-(2-hydroxypropyl)-N,N,N-trimethylammonium-2-ethylhexanoate was blended as an isocyanuration catalyst. The isocyanate group concentration was measured, and the reaction was continued until its concentration reached 48.9% by mass (that is, conversion rate of 10% by mass). When a predetermined conversion rate (conversion rate of 10% by mass) was reached after 50 minutes, 0.12 parts by mass of o-toluenesulfonamide was added thereto. The obtained reaction liquid mixture was passed through a thin film distillation device (temperature: 150° C., vacuum degree: 0.093 kPa) to remove unreacted pentamethylene diisocyanate monomer, and further, 0.02 parts by mass of o-toluenesulfonamide and 0.003 parts by mass of benzoyl chloride were added to 100 parts by mass of the obtained residue to obtain an alcoholic modified isocyanurate derivative of PDI. This was referred to as an isocyanate (a-2).

In the isocyanate (a-2), the average number of the isocyanate group was 3.1, the isocyanate monomer concentration was 0.5% by mass, the isocyanate group concentration was 24.7% by mass, and the viscosity at 25° C. was 2000 mPa·s.

Further, the mole ratio of the allophanate group to the isocyanurate group by $^1$H-NMR measurement was an allophanate group/isocyanurate group=7.4/100.

Preparation Example 3 (Isocyanate (a-3) (Isocyanurate Derivative of PDI))

A four-neck flask equipped with a thermometer, a stirring device, a reflux tube, and a nitrogen introducing tube was charged with 500 parts by mass of PDI, 0.3 parts by mass of 2,6-di(tert-butyl)-4-methylphenol, and 0.3 parts by mass of tris(tridecyl) phosphite to be heated to 80° C. Then, 0.05 parts by mass of N-(2-hydroxypropyl)-N,N,N-tri methylammonium-2-ethylhexanoate was blended as an isocyanuration catalyst. The isocyanate group concentration was measured, and the reaction was continued until its concentration reached 49.0% by mass (that is, conversion rate of 10% by mass). When a predetermined conversion rate (conversion rate of 10% by mass) was reached after 50 minutes, 0.12 parts by mass of o-toluenesulfonamide was added thereto. The obtained reaction liquid mixture was passed through a thin film distillation device (temperature: 150° C., vacuum degree: 0.093 kPa) to remove unreacted pentamethylene diisocyanate monomer, and further, 0.02 parts by mass of o-toluenesulfonamide and 0.003 parts by mass of benzoyl chloride were added to 100 parts by mass of the obtained residue to obtain an isocyanurate derivative of PDI. This was referred to as an isocyanate (a-3).

In the isocyanate (a-3), the average number of the isocyanate group was 3.2, the isocyanate monomer concentration was 0.5% by mass, the isocyanate group concentration was 24.9% by mass, and the viscosity at 25° C. was 2800 mPa·s.

Further, the mole ratio of the allophanate group to the isocyanurate group by $^1$H-NMR measurement was an allophanate group/isocyanurate group=0/100.

Preparation Example 4 (Isocyanate (a-4) (Alcoholic Modified Isocyanurate Derivative of PDI))

A four-neck flask equipped with a thermometer, a stirring device, a reflux tube, and a nitrogen introducing tube was charged with 500 parts by mass of PDI, 0.5 parts by mass of isobutyl alcohol, 0.3 parts by mass of 2,6-di(tert-butyl)-4-methylphenol, and 0.3 parts by mass of tris(tridecyl) phosphite to be reacted at 80° C. for 2 hours.

Then, 0.05 parts by mass of N-(2-hydroxypropyl)-N,N,N-trimethylammonium-2-ethylhexanoate was blended as an isocyanuration catalyst. The isocyanate group concentration was measured, and the reaction was continued until its concentration reached 40.3% by mass (that is, conversion rate of 26% by mass). When a predetermined conversion rate (conversion rate of 26% by mass) was reached after 130 minutes, 0.12 parts by mass of o-toluenesulfonamide was added thereto. The obtained reaction liquid mixture was passed through a thin film distillation device (temperature: 150° C., vacuum degree: 0.093 kPa) to remove unreacted pentamethylene diisocyanate monomer, and further, 0.02 parts by mass of o-toluenesulfonamide and 0.003 parts by mass of benzoyl chloride were added to 100 parts by mass of the obtained residue to obtain an alcoholic modified isocyanurate derivative of PDI. This was referred to as an isocyanate (a-4).

In the isocyanate (a-4), the average number of the isocyanate group was 3.8, the isocyanate monomer concentration was 0.5% by mass, the isocyanate group concentration was 23.1% by mass, and the viscosity at 25° C. was 9000 mPa·s.

Further, the mole ratio of the allophanate group to the isocyanurate group by $^1$H-NMR measurement was an allophanate group/isocyanurate group=5.0/100.

Preparation Example 5 (Isocyanate (a-5) (Alophanate Derivative of PDI))

In a reactor equipped with a thermometer, a stirring device, a nitrogen introducing tube, and a cooling tube, 1500 parts by mass of PDI, 24 parts by mass of isobutanol, 0.3 parts by mass of 2,6-di(t-butyl)-4-methylphenol, and 0.3 parts by mass of tris(tridecyl) phosphite were charged under a nitrogen atmosphere to be subjected to a urethanization reaction at 85° C. for 3 hours.

Then, 0.02 parts by mass of tris(2-ethylhexanoic acid) bismuth was added as an allophanatization catalyst, and the obtained mixture was reacted until the isocyanate group concentration reached a calculated value (46.7% by mass, that is, a conversion rate of 10% by mass), and then, 0.02 parts by mass of o-toluenesulfonamide was added thereto.

Thereafter, the obtained reaction liquid was passed through a thin film distillation device (vacuum degree of 0.093 KPa, temperature of 150° C.) to remove unreacted pentamethylene diisocyanate, and further, 0.02 parts by mass of o-toluenesulfonamide was added to 100 parts by mass of the obtained residue to obtain an allophanate derivative of PDI. This was referred to as an isocyanate (a-5).

In the isocyanate (a-5), the average number of the isocyanate group was 2.0, the isocyanate group concentration was 20.4% by mass, the viscosity at 25° C. was 24 mPa·s, and the isocyanate monomer concentration was 0.2% by mass.

Further, the mole ratio of the allophanate group to the isocyanurate group by $^1$H-NMR measurement was an allophanate group/isocyanurate group=100/0.

Preparation Example 6 (Isocyanate (a-6) (Alcoholic Modified Isocyanurate Derivative of HDI))

An alcoholic modified isocyanurate derivative of HDI was obtained in the same manner as in Preparation Example 1, except that PDI was changed to a hexamethylene diisocyanate (manufactured by Mitsui Chemicals, Inc., trade name: Takenate 700 (hereinafter, referred to as HDI)), This was referred to as an isocyanate (a-6).

In the isocyanate (a-6), the average number of the isocyanate group was 2,9, the isocyanate monomer concentration was 0.5% by mass, the isocyanate group concentration was 22.1% by mass, and the viscosity at 25° C. was 840 mPa·s.

Further, the mole ratio of the allophanate group to the isocyanurate group by $^1$H-NMR measurement was an allophanate group/isocyanurate group=34.3/100.

Preparation Example 7 (Isocyanate (a-7) (Polyol Derivative of PDI (TMP Modified Product))

A four-neck flask equipped with a stirring device, a thermometer, a reflux tube, and a nitrogen introducing tube was charged with 200 parts by mass of PDT to be heated to 95° C. under a nitrogen atmosphere with stirring. Next, 21.1 parts by mass of trimethylolpropane (hereinafter, referred to as TMP) was charged into a dropping funnel to be heated with a ribbon heater.

The melted TMP was added dropwise over a period of about 60 minutes. Thereafter, the urethanization reaction was continued for about 3 hours until the isocyanate group concentration reached a calculated value. The obtained reaction liquid was passed through a thin film distillation device (vacuum degree of 50 Pa, temperature of 130° C.) to remove unreacted thereby obtaining a polyol derivative of PDI (TMP modified product), This was referred to as an isocyanate (a-7).

In the isocyanate (a-7), the average number of the isocyanate group was 3.7, the isocyanate group concentration was 13.8% by mass, and the viscosity at 25° C. was 450 mPa·s.

(2) Polyol (B)

Preparation Example 1 (Polyol (b-1))

A polyoxyalkylene polyol (polyether polyol obtained by subjecting propylene glycol to addition polymerization of propylene oxide, number average molecular weight (Mn)=2000, average functionality of 2, hydroxyl value of 56 mgKOH/g, ethylene oxide concentration in total oxyalkylene=0% by mass) was referred to as a polyol (b-1).

The polyol (b-1) was a polyoxypropylene glycol (PPG).

Preparation Example 2 (Polyol (b-2))

A polyoxyalkylene polyol (polyether polyol obtained by subjecting propylene glycol to addition polymerization of propylene oxide, number average molecular weight (Mn)=1000, average functionality of 2, hydroxyl value of 112 mgKOH/g, ethylene oxide concentration in total oxyalkylene=0% by mass) was referred to as a polyol (b-2).

The polyol (b-2) was a polyoxypropylene glycol (PPG).

Preparation Example 2-1 (Polyol (b-2-1))

The polyol (b-1) having a number average molecular weight of 2000 and the polyol (b-2) having a number average molecular weight of 1000 were mixed so as to have 1:1 (b-1:b-2 (mass ratio)), and as a mixture, a polyol (b-2-1) was obtained. The polyol (b-2-1) had a number average molecular weight of about 1300 (1335), an average functionality of 2, a hydroxyl value of 84 mgKOH/g, and the ethylene oxide concentration in the total oxyalkylene of 0% by mass.

The polyol (b-2-1) was a polyoxypropylene glycol (PPG).

Preparation Example 2-2 (Polyol (b-2-2))

The polyol (b-1) having a number average molecular weight of 2000 and the polyol (b-2) having a number average molecular weight of 1000 were mixed so as to have 4:1 (b-1:b-2 (mass ratio)), and as a mixture, a polyol (b-2-2) was obtained. The polyol (b-2-2) had a number average molecular weight of about 1700 (1674), an average functionality of 2, a hydroxyl value of 67 mgKOH/g, and the ethylene oxide concentration in the total oxyalkylene of 0% by mass.

The polyol (b-2-2) was a polyoxypropylene glycol (PPG).

Preparation Example 3 (Polyol (b-3))

A polyoxyalkylene polyol (polyether polyol obtained by subjecting propylene glycol to addition polymerization of propylene oxide, number average molecular weight (Mn)=3000, average functionality of 2, hydroxyl value of 37 mgKOH/g, ethylene oxide concentration in total oxyalkylene=0% by mass) was referred to as a polyol (b-3).

The polyol (b-3) was a polyoxypropylene glycol (PPG).

Preparation Example 4 (Polyol (b-4))

A polyoxyalkylene polyol (polyether polyol obtained by subjecting propylene glycol to addition polymerization of propylene oxide, number average molecular weight (Mn)=4000, average functionality of 2, hydroxyl value of 28 mgKOH/g, ethylene oxide concentration in total oxyalkylene=0% by mass) was referred to as a polyol (b-4).

The polyol (b-4) was a polyoxypropylene glycol (PPG).

Preparation Example 5 (Polyol (b-5))

A polyoxyalkylene polyol (polyether polyol obtained by subjecting glycerine to addition polymerization of propylene oxide, number average molecular weight (Mn)=3000, average functionality of 3, hydroxyl value of 56 mgKOH/g, ethylene oxide concentration in total oxyalkylene=0% by mass) was referred to as a polyol (b-5).

The polyol (b-5) was a polypropylene triol (PPT).

Preparation Example 6 (Polyol (b-6))

A polyoxyalkylene polyol (polyether polyol obtained by subjecting glycerine to addition polymerization of propylene oxide and next, to addition polymerization of ethylene oxide, number average molecular weight (Mn)=2000, average functionality of 2, hydroxyl value of 56 mgKOH/g, ethylene oxide concentration in total oxyalkylene=20% by mass) was referred to as a polyol (b-6).

The polyol (b-6) was an ethylene oxide (EO)-propylene oxide (PO) copolymer.

Preparation Example 7 (Polyol (b-7))

A polyoxyalkylene polyol (polyether polyol obtained by subjecting glycerine to addition polymerization of propylene oxide and next, to addition polymerization of ethylene oxide, number average molecular weight (Mn)=2000, average functionality of 2, hydroxyl value of 56 mgKOH/g, ethylene oxide concentration in total oxyalkylene=40% by mass) was referred to as a polyol (b-7).

The polyol (b-7) was an ethylene oxide (EO)-propylene oxide (PO) copolymer.

Preparation Example 8 (Polyol (b-8))

A polytetramethylene ether glycol having a number average molecular weight of 2000 (PTMEG, manufactured by Hodogaya Chemical Co., Ltd., trade name: PTG-2000SN, hydroxyl value of 56 mgKOH/g, average functionality of 2) was referred to as a polyol (1)-8).

Preparation Example 9 (Polyol (b-9))

A polytetramethylene ether glycol having a number average molecular weight of 1000 (PTMEG, manufactured by Hodogaya Chemical Co., Ltd., trade name: PTG-1000, hydroxyl value of 112 mgKOH/g, average functionality of 2) was referred to as a polyol (b-9).

Preparation Example 10 (Polyol (b-10))

An amorphous polytetramethylene ether glycol having a number average molecular weight of 1800 (manufactured by ASAHI KASEI FIBERS CORPORATION, trade name: PTXG, hydroxyl value of 60 mgKOH/g, average functionality of 2, copolymer of tetrahydrofuran and neopentyl glycol) was referred to as a polyol (b-10).

(3) Plasticizer (c)

Preparation Example 11 (Plasticizer (c-1))

A diisononylcyclohexane-1,2-dicarboxylate (manufactured by BASF SE, trade name: Hexamol DINCH, boiling point of 394° C.) was referred to as a plasticizer c-1).

Preparation Example 12 (Plasticizer (c-2))

A diisononyl adipate (manufactured by Mitsubishi Chemical Corporation, trade name: DINA, boiling point of 250° C.) was referred to as a plasticizer (c-2).

Preparation Example 13 (Plasticizer (c-3))

A di-(2-ethylhexyl) phthalate (manufactured by Mitsubishi Chemical Corporation, trade name: DOP, boiling point of 386° C.) was referred to as a plasticizer (c-3).

Preparation Example 14 (Plasticizer (c-4))

A chloroparaffin (manufactured by Sigma-Aldrich Co, LLC, trade name: Chloroparaffin) was referred to as a plasticizer (c-4).

(4) Catalyst (d)
Manufactured by TOKYO CHEMICAL INDUSTRY CO., LTD., reagent, dibutyltin dilaurate
(5) Antifoaming Agent (e)
Manufactured by BYK Japan KK, trade name: BYK-088

3. Production of Polyurethane Gel

Example 1

The isocyanate (a-1), the polyol (b-1), and the plasticizer (c-1) were prepared at the mass ratio shown in Table 1 to obtain a polyurethane gel material (preparation step).

Then, 100 parts by mass of the polyol (b-1) adjusted at 25° C., 17.93 parts by mass of the polyisocyanate (a-1) (equivalent ratio of isocyanate group to hydroxyl group (NCO/hydroxyl group=1.0)), 200 parts by weight of the plasticizer (c-1), 0.03 parts by weight of the dibutyltin dilaurate (d) of the catalyst, and 0.2 parts by weight of the defoaming agent (e) were put into a plastic container, and the mixture was stirred and mixed for one minute under stirring at 7000 rpm by using a three-one motor manufactured by SHINTO Scientific Co., Ltd., trade name: HEIDOM FBL3000).

Thereafter, the liquid mixture was immediately defoamed under a reduced pressure, and after removing the foam of the liquid mixture, it was poured into the following metal mold which was previously coated with Teflon (registered trademark) and heated to 80° C. without contamination of bubbles. Then, the liquid mixture was allowed to react at 80° C. for 2 hours to obtain a urethane gel.

Sheet metal mold having a thickness of 2 mm
Square block metal mold having a size of 5 cm×5 cm×height of 15 mm
Columnar metal mold having a diameter of 29 mm× (height of 13 mm This polyurethane gel was left to stand in a room at 23° C. with relative humidity of 55% for seven days and then, subjected to various property measurement.

Examples 2 to 17 and Comparative Examples 1 to 12

A polyurethane gel was obtained in the same manner as in Example 1, except that the formulation was changed to those shown in Tables 1 to 4.

4. Evaluation

<Curability of Polyurethane Gel>
A liquid mixture of a polyurethane gel material was poured into a block metal mold, and the mixture was reacted at 80° C. for 2 hours. Then, the flowability of the polyurethane gel material was confirmed, and the curability of the polyurethane gel was evaluated. Criteria for evaluation are as follows.

Bad: the polyurethane gel material has flowability and cannot retain its shape after demolding.
Excellent: the polyurethane gel material has flowability and can retain its shape after demolding.

<Mechanical Properties of Polyurethane Gel (Elongation at Break (EL) (Unit: %)>
A polyurethane gel prepared with a 2 mm-sheet metal mold was punched into a No. 3 test piece shape to prepare a measurement sample. The measurement sample was subjected to a tensile test by using a tensile compressive tester (manufactured by INTESCO co., ltd., Model 205N) in conformity with JIS K-6400 (2012) to calculate the elongation at break.

<Bleeding Resistance of Polyurethane Gel>

A polyurethane gel obtained with a columnar metal mold was punched into a columnar test piece to prepare a measurement sample, and the weight thereof was measured (W1).

After the upper and the lower surfaces of the sample were sandwiched between filter papers (manufactured by Advantec Tokyo Kaisha, Ltd., FILTER PAPER No. 5C) and treated in an oven at 80° C. for five days, they were left to stand in a room at 23° C. with relative humidity of 55% for one day, and then, the surface was further thoroughly wiped off with the filter paper to measure the weight thereof again (W2).

Bleeding resistance was evaluated by a weight change before and after treatment (W: W=(W1−W2)/W1×100 (unit: %)).

<Low Tackiness of Polyurethane Gel>

A stainless steel plate having a thickness of 1 mm×4 cm×4 cm (material: JIS G 4305 SUS304, surface finish BA, surface roughness: JIS B0601, difference Ra=50±25 nm) was placed on the polyurethane gel obtained with the block metal mold to be then left to stand in a room at 23° C. with relative humidity of 55% for one day. Thereafter, the stress (kgf/16 cm$^2$) required when the stainless steel plate was removed with a push-pull gauge was measured.

<Asker C Hardness of Polyurethane Gel>

The Asker C hardness of the polyurethane gel obtained with the block metal mold was measured by a type C hardness test of JIS K 7312 (1996).

TABLE 1

| | | | | Ex. 1 | Ex. 2 | Ex. 3 | Ex. 4 | Ex. 5 | Comparative Ex. 1 | Comparative Ex. 2 | Comparative Ex. 3 |
|---|---|---|---|---|---|---|---|---|---|---|---|
| Mixing Formulation (parts by mass) | Polyisocyanate (A) | Preparation Ex. 1 (Alcoholic Modified Isocyanurate Derivative of PDI) | a-1 | 100 | — | — | 60 | — | — | 30 | — |
| | | Preparation Ex. 2 (Alcoholic Modified Isocyanurate Derivative of PDI) | a-2 | — | 100 | — | — | — | — | — | — |
| | | Preparation Ex. 3 (Isocyanurate Derivative of PDI) | a-3 | — | — | 100 | — | — | — | — | — |
| | | Preparation Ex. 4 (Alcoholic Modified Isocyanurate Derivative of PDI) | a-4 | — | — | — | — | — | 100 | — | — |
| | | Preparation Ex. 5 (Allophanate Derivative of PDI) | a-5 | — | — | — | 40 | — | — | 70 | — |
| | | Preparation Ex. 6 (Alcoholic Modified Isocyanurate Derivative of HDI) | a-6 | — | — | — | — | 100 | — | — | — |
| | | Preparation Ex. 7 (Polyol Derivative of PDI) | a-7 | — | — | — | — | — | — | — | 100 |
| | | Average Functionality | | 2.8 | 3.1 | 3.2 | 2.5 | 2.9 | 3.8 | 2.2 | 3.7 |
| | Polyol (B) | Preparation Ex. 1 (PPG: Mn2000) | b-1 | 100 | 100 | 100 | 100 | 100 | 100 | 100 | 100 |
| | | Preparation Ex. 2-1 (PPG: Mn1300) | b-2-1 | — | — | — | — | — | — | — | — |
| | | Preparation Ex. 2-2 (PPG: Mn1700) | b-2-2 | — | — | — | — | — | — | — | — |
| | | Preparation Ex. 3 (PPG: Mn3000) | b-3 | — | — | — | — | — | — | — | — |
| | | Preparation Ex. 4 (PPG: Mn4000) | b-4 | — | — | — | — | — | — | — | — |
| | | Preparation Ex. 5 (PPT: Mn3000) | b-5 | — | — | — | — | — | — | — | — |
| | | Preparation Ex. 6 (EOPO: Mn2000) | b-6 | — | — | — | — | — | — | — | — |
| | | Preparation Ex. 7 (EOPO: Mn2000) | b-7 | — | — | — | — | — | — | — | — |
| | | Preparation Ex. 8 (PTMEG: Mn2000) | b-8 | — | — | — | — | — | — | — | — |
| | | Preparation Ex. 9 (PTMEG: Mn1000) | b-9 | — | — | — | — | — | — | — | — |

TABLE 1-continued

|  |  |  |  | Ex. 1 | Ex. 2 | Ex. 3 | Ex. 4 | Ex. 5 | Comparative Ex. 1 | Comparative Ex. 2 | Comparative Ex. 3 |
|---|---|---|---|---|---|---|---|---|---|---|---|
|  |  | Preparation Ex. 10 (Amorphous PTMEG: Mn1800) | b-10 | — | — | — | — | — | — | — | — |
|  |  | Average Functionality |  | 2.0 | 2.0 | 2.0 | 2.0 | 2.0 | 2.0 | 2.0 | 2.0 |
|  |  | Average Hydroxyl Value (mgKOH/g) |  | 56 | 56 | 56 | 56 | 56 | 56 | 56 | 56 |
|  |  | EO Content (% by mass) |  | 0 | 0 | 0 | 0 | 0 | 0 | 0 | 0 |
| Plasticizer (c) (parts by mass per 100 parts by mass of polyol) |  | Diisononylcyclohexane-1,2-dicarboxylate (DINCH) | c-1 | 200 | 200 | 200 | 200 | 200 | 200 | 200 | 200 |
|  |  | Diisononyl Adipate (DINA) | c-2 | — | — | — | — | — | — | — | — |
|  |  | Di-(2-ethylhexyl) phthalate (DOP) | c-3 | — | — | — | — | — | — | — | — |
|  |  | Chloroparaffin | c-4 | — | — | — | — | — | — | — | — |
| Evaluation |  | Curability |  | Excellent | Excellent | Excellent | Excellent | Excellent | Excellent | Bad | Excellent |
|  |  | Elongation at Break (%) |  | 190 | 118 | 102 | 233 | 185 | 78 | — | 54 |
|  |  | Bleeding Resistance (weight loss rate: %) |  | 0.6 | 0.3 | 0.2 | 0.9 | 0.7 | 0.2 | — | 0.8 |
|  |  | Low Tackiness (tensile load value: kgf/16 cm$^2$) |  | 1.1 | 0.9 | 0.8 | 1.3 | 1.2 | 0.7 | — | 1.3 |
|  |  | Asker C Hardness |  | 7 | 19 | 28 | <1 | 8 | 30 | — | 14 |

TABLE 2

|  |  |  |  | Ex. 6 | Ex. 7 | Ex. 8 | Ex. 9 | Ex. 10 | Ex. 11 |
|---|---|---|---|---|---|---|---|---|---|
| Mixing Formulation (parts by mass) | Polyisocyanate (A) | Preparation Ex. 1 (Alcoholic Modified Isocyanurate Derivative of PDI) | a-1 | 100 | 100 | 100 | 100 | 100 | 100 |
|  |  | Preparation Ex. 2 (Alcoholic Modified Isocyanurate Derivative of PDI) | a-2 | — | — | — | — | — | — |
|  |  | Preparation Ex. 3 (Isocyanurate Derivative of PDI) | a-3 | — | — | — | — | — | — |
|  |  | Preparation Ex. 4 (Alcoholic Modified Isocyanurate Derivative of PDI) | a-4 | — | — | — | — | — | — |
|  |  | Preparation Ex. 5 (Allophanate Derivative of PDI) | a-5 | — | — | — | — | — | — |
|  |  | Preparation Ex. 6 (Alcoholic Modified Isocyanurate Derivative of HDI) | a-6 | — | — | — | — | — | — |
|  |  | Preparation Ex. 7 (Polyol Derivative of PDI) | a-7 | — | — | — | — | — | — |
|  |  | Average Functionality |  | 2.8 | 2.8 | 2.8 | 2.8 | 2.8 | 2.8 |
|  | Polyol (B) | Preparation Ex. 1 (PPG: Mn2000) | b-1 | — | — | — | — | 90 | — |
|  |  | Preparation Ex. 2-1 (PPG: Mn1300) | b-2-1 | — | — | — | — | — | — |
|  |  | Preparation Ex. 2-2 (PPG: Mn1700) | b-2-2 | 100 | — | — | — | — | — |
|  |  | Preparation Ex. 3 (PPG: Mn3000) | b-3 | — | 100 | — | — | — | — |
|  |  | Preparation Ex. 4 (PPG: Mn4000) | b-4 | — | — | — | — | — | — |

TABLE 2-continued

|  |  |  | Ex. 6 | Ex. 7 | Ex. 8 | Ex. 9 | Ex. 10 | Ex. 11 |
|---|---|---|---|---|---|---|---|---|
|  | Preparation Ex. 5 (PPT: Mn3000) | b-5 | — | — | — | — | 10 | — |
|  | Preparation Ex. 6 (EOPO: Mn2000) | b-6 | — | — | — | 100 | — | — |
|  | Preparation Ex. 7 (EOPO: Mn2000) | b-7 | — | — | — | — | — | — |
|  | Preparation Ex. 8 (PTMEG: Mn2000) | b-8 | — | — | 100 | — | — | — |
|  | Preparation Ex. 9 (PTMEG: Mn1000) | b-9 | — | — | — | — | — | — |
|  | Preparation Ex. 10 (Amorphous PTMEG: Mn1800) | b-10 | — | — | — | — | — | 100 |
|  | Average Functionality |  | 2.0 | 2.0 | 2.0 | 2.0 | 2.1 | 2.0 |
|  | Average Hydroxyl Value (mgKOH/g) |  | 67 | 37 | 56 | 56 | 56 | 60 |
|  | EO Content (% by mass) |  | 0 | 0 | 0 | 20 | 0 | 0 |
| Plasticizer (c) (parts by mass per 100 parts by mass of polyol) | Diisononylcyclo-hexane-1,2-dicar-boxylate (DINCH) | c-1 | 200 | 200 | 200 | 200 | 200 | 200 |
|  | Diisononyl Adipate (DINA) | c-2 | — | — | — | — | — | — |
|  | Di-(2-ethylhexyl) phthalate (DOP) | c-3 | — | — | — | — | — | — |
|  | Chloroparaffin | c-4 | — | — | — | — | — | — |
| Evaluation | Curability |  | Excellent | Excellent | Excellent | Excellent | Excellent | Excellent |
|  | Elongation at Break (%) |  | 173 | 284 | 160 | 186 | 178 | 175 |
|  | Bleeding Resistance (weight loss rate: %) |  | 2.4 | 0.3 | 0.4 | 1.5 | 0.6 | 0.6 |
|  | Low Tackiness (tensile load value: kgf/16 cm$^2$) |  | 1.1 | 1.2 | 1.0 | 0.9 | 1.0 | 1.1 |
|  | Asker C Hardness |  | 20 | 2 | 37 | 18 | 10 | 30 |

TABLE 3

|  |  |  |  | Comparative Ex. 4 | Comparative Ex. 5 | Comparative Ex. 6 | Comparative Ex. 7 | Comparative Ex. 8 | Comparative Ex. 9 |
|---|---|---|---|---|---|---|---|---|---|
| Mixing Formulation (parts by mass) | Polyisocyanate (A) | Preparation Ex. 1 (Alcoholic Modified Isocyanurate Derivative of PDI) | a-1 | 100 | 100 | 100 | 100 | 100 | 100 |
|  |  | Preparation Ex. 2 (Alcoholic Modified Isocyanurate Derivative of PDI) | a-2 | — | — | — | — | — | — |
|  |  | Preparation Ex. 3 (Isocyanurate Derivative of PDI) | a-3 | — | — | — | — | — | — |
|  |  | Preparation Ex. 4 (Alcoholic Modified Isocyanurate Derivative of PDI) | a-4 | — | — | — | — | — | — |
|  |  | Preparation Ex. 5 (Allophanate Derivative of PDI) | a-5 | — | — | — | — | — | — |
|  |  | Preparation Ex. 6 (Alcoholic Modified Isocyanurate Derivative of HDI) | a-6 | — | — | — | — | — | — |
|  |  | Preparation Ex. 7 (Polyol Derivative of PDI) | a-7 | — | — | — | — | — | — |
|  |  | Average Functionality |  | 2.8 | 2.8 | 2.8 | 2.8 | 2.8 | 2.8 |

TABLE 3-continued

| | | | Comparative Ex. 4 | Comparative Ex. 5 | Comparative Ex. 6 | Comparative Ex. 7 | Comparative Ex. 8 | Comparative Ex. 9 |
|---|---|---|---|---|---|---|---|---|
| Polyol (B) | Preparation Ex. 1 (PPG: Mn2000) | b-1 | — | — | — | 50 | — | — |
| | Preparation Ex. 2-1 (PPG: Mn1300) | b-2-1 | 100 | — | — | — | — | — |
| | Preparation Ex. 2-2 (PPG: Mn1700) | b-2-2 | — | — | — | — | — | — |
| | Preparation Ex. 3 (PPG: Mn3000) | b-3 | — | — | — | — | — | — |
| | Preparation Ex. 4 (PPG: Mn4000) | b-4 | — | 100 | — | — | — | — |
| | Preparation Ex. 5 (PPT: Mn3000) | b-5 | — | — | 100 | 50 | — | — |
| | Preparation Ex. 6 (EOPO: Mn2000) | b-6 | — | — | — | — | — | — |
| | Preparation Ex. 7 (EOPO: Mn2000) | b-7 | — | — | — | — | — | 100 |
| | Preparation Ex. 8 (PTMEG: Mn2000) | b-8 | — | — | — | — | — | — |
| | Preparation Ex. 9 (PTMEG: Mn1000) | b-9 | — | — | — | — | 100 | — |
| | Preparation Ex. 10 (Amorphous PTMEG: Mn1800) | b-10 | — | — | — | — | — | — |
| | Average Functionality | | 2.0 | 2.0 | 3 | 2.5 | 2.0 | 2.0 |
| | Average Hydroxyl Value (mgKOH/g) | | 84 | 28 | 56 | 56 | 112 | 56 |
| | EO Content (% by mass) | | 0 | 0 | 0 | 0 | 0 | 40 |
| Plasticizer (c) (parts by mass per 100 parts by mass of polyol) | Diisononylcyclohexane-1,2-dicarboxylate (DINCH) | c-1 | 200 | 200 | 200 | 200 | 200 | 200 |
| | Diisononyl Adipate (DINA) | c-2 | — | — | — | — | — | — |
| | Di-(2-ethylhexyl) phthalate (DOP) | c-3 | — | — | — | — | — | — |
| | Chloroparaffin | c-4 | — | — | — | — | — | — |
| Evaluation | Curability | | Excellent | Excellent | Excellent | Excellent | Excellent | Excellent |
| | Elongation at Break (%) | | 104 | 301 | 36 | 4.5 | 170 | 165 |
| | Bleeding Resistance (weight loss rate: %) | | 5.1 | 0.1 | 0.2 | 0.3 | 4.8 | 4.9 |
| | Low Tackiness (tensile load value: kgf/16 cm$^2$) | | 0.9 | 1.9 | 0.8 | 0.9 | 0.9 | 0.9 |
| | Asker C Hardness | | 30 | <1 | 34 | 20 | 43 | 10 |

TABLE 4

| | | | | Ex. 12 | Ex. 13 | Ex. 14 | Ex. 15 | Ex. 16 | Ex. 17 | Comparative Ex. 10 | Comparative Ex. 11 | Comparative Ex. 12 |
|---|---|---|---|---|---|---|---|---|---|---|---|---|
| Mixing Formulation (parts by mass) | Polyisocyanate (A) | Preparation Ex. 1 (Alcoholic Modified Isocyanurate Derivative of PDI) | a-1 | 100 | 100 | 100 | 100 | 100 | 100 | 100 | 100 | 100 |
| | | Preparation Ex. 2 (Alcoholic Modified Isocyanurate Derivative of PDI) | a-2 | — | — | — | — | — | — | — | — | — |
| | | Preparation Ex. 3 (Isocyanurate Derivative of PDI) | a-3 | — | — | — | — | — | — | — | — | — |

TABLE 4-continued

|  |  |  | Ex. 12 | Ex. 13 | Ex. 14 | Ex. 15 | Ex. 16 | Ex. 17 | Comparative Ex. 10 | Comparative Ex. 11 | Comparative Ex. 12 |
|---|---|---|---|---|---|---|---|---|---|---|---|
|  | Preparation Ex. 4 (Alcoholic Modified Isocyanurate Derivative of PDI) | a-4 | — | — | — | — | — | — | — | — | — |
|  | Preparation Ex. 5 (Allophanate Derivative of PDI) | a-5 | — | — | — | — | — | — | — | — | — |
|  | Preparation Ex. 6 (Alcoholic Modified Isocyanurate Derivative of HDI) | a-6 | — | — | — | — | — | — | — | — | — |
|  | Preparation Ex. 7 (Polyol Derivative of PDI) | a-7 | — | — | — | — | — | — | — | — | — |
|  | Average Functionality |  | 2.8 | 2.8 | 2.8 | 2.8 | 2.8 | 2.8 | 2.8 | 2.8 | 2.8 |
| Polyol (B) | Preparation Ex. 1 (PPG: Mn2000) | b-1 | 100 | 100 | 100 | 100 | — | 100 | 100 | 100 | 100 |
|  | Preparation Ex. 2-1 (PPG: Mn1300) | b-2-1 | — | — | — | — | — | — | — | — | — |
|  | Preparation Ex. 2-2 (PPG: Mn1700) | b-2-2 | — | — | — | — | 100 | — | — | — | — |
|  | Preparation Ex. 3 (PPG: Mn3000) | b-3 | — | — | — | — | — | — | — | — | — |
|  | Preparation Ex. 4 (PPG: Mn4000) | b-4 | — | — | — | — | — | — | — | — | — |
|  | Preparation Ex. 5 (PPT: Mn3000) | b-5 | — | — | — | — | — | — | — | — | — |
|  | Preparation Ex. 6 (EOPO: Mn2000) | b-6 | — | — | — | — | — | — | — | — | — |
|  | Preparation Ex. 7 (EOPO: Mn2000) | b-7 | — | — | — | — | — | — | — | — | — |
|  | Preparation Ex. 8 (PTMEG: Mn2000) | b-8 | — | — | — | — | — | — | — | — | — |
|  | Preparation Ex. 9 (PTMEG: Mn1000) | b-9 | — | — | — | — | — | — | — | — | — |
|  | Preparation Ex. 10 (Amorphous PTMEG: Mn1800) | b-10 | — | — | — | — | — | — | — | — | — |
|  | Average Functionality |  | 2.0 | 2.0 | 2.0 | 2.0 | 2.0 | 2.0 | 2.0 | 2.0 | 2.0 |
|  | Average Hydroxyl Value (mgKOH/g) |  | 56 | 56 | 56 | 56 | 62 | 56 | 56 | 56 | 56 |
|  | EO Content (% by mass) |  | 0 | 0 | 0 | 0 | 0 | 0 | 0 | 0 | 0 |
| Plasticizer (c) (parts by mass per 100 parts by mass of polyol) | Diisononylcyclo-hexane-1,2-dicarboxylate (DINCH) | c-1 | — | 400 | 50 | — | 400 | 100 | 10 | 450 | — |
|  | Diisononyl Adipate (DINA) | c-2 | 200 | — | — | — | — | 100 | — | — | — |
|  | Di-(2-ethylhexyl) phthalate (DOP) | c-3 | — | — | — | 200 | — | — | — | — | — |
|  | Chloroparaffin | c-4 | — | — | — | — | — | — | — | — | 200 |
| Evaluation | Curability |  | Excellent | Excellent | Excellent | Excellent | Excellent | Excellent | Excellent | Excellent | Bad |
|  | Elongation at Break (%) |  | 196 | 198 | 173 | 183 | 185 | 193 | 236 | 152 | — |
|  | Bleeding Resistance (weight loss rate: %) |  | 0.4 | 2.5 | 0.1 | 1.8 | 2.8 | 0.5 | 0.0 | 3.3 | — |
|  | Low Tackiness (tensile load value: kgf/16 cm$^2$) |  | 1.1 | 0.3 | 1.5 | 1.0 | 1.1 | 1.1 | 2.0 | 0.2 | — |
|  | Asker C Hardness |  | 9 | <1 | 38 | 10 | <1 | 8 | 52 | <1 | — |

The invention claimed is:

1. A polyurethane gel material comprising:
   an aliphatic polyisocyanate (A) having an average functionality of 2.3 or more and 3.2 or less,
   a polyol (B) having an average functionality of 2.0 or more and 2.3 or less, and
   a plasticizer (C) having an ester group, wherein
   the aliphatic polyisocyanate (A) contains an isocyanurate derivative of an aliphatic diisocyanate and/or an alcoholic modified isocyanurate derivative of an aliphatic diisocyanate,
   the polyol (B) contains a polyoxyalkylene (carbon number of 2 to 3) polyol having an ethylene oxide content of 30% by mass or less, and/or a polytetramethylene ether glycol,
   the polyol (B) has an average hydroxyl value of 30 mgKOH/g or more and 70 mgKOH/g or less,
   a ratio of the plasticizer (C) per 100 parts by mass of the polyol component (B) is 100 parts by mass or more and 400 parts by mass or less, and
   an equivalent ratio (NCO/hydroxyl group) of an isocyanate group in the aliphatic polyisocyanate (A) to a hydroxyl group in the polyol (B) is 0.8 or more and 1.2 or less.

2. The polyurethane gel material according to claim 1, wherein
   the polyol (B) has an average functionality of 2.0.

3. The polyurethane gel material according to claim 1, wherein
   the polyol (B) has an average hydroxyl value of 37 mgKOH/g or more and 56 mgKOH/g or less.

4. The polyurethane gel material according to claim 1, wherein
   the aliphatic polyisocyanate (A) has an average functionality of 2.3 or more and 3.0 or less.

5. The polyurethane gel material according to claim 1, wherein
   the aliphatic diisocyanate includes a pentamethylene diisocyanate and/or a hexamethylene diisocyanate.

6. The polyurethane gel material according to claim 1, wherein
   a ratio of the plasticizer (C) per 100 parts by mass of the polyol component (B) is 100 parts by mass or more and 200 parts by mass or less.

7. The polyurethane gel material according to claim 1, wherein
   the plasticizer (C) is cyclohexanedicarboxylic acid esters and/or adipic acid esters.

8. A polyurethane gel being a reaction product of the polyurethane gel material according to claim 1.

9. A pseudo-biomaterial comprising the polyurethane gel according to claim 8.

10. A method for producing a polyurethane gel comprising:
    a preparation step of preparing the polyurethane gel material according to claim 1 and
    a reaction step of reacting and curing the polyurethane gel material to obtain a polyurethane gel, wherein
    in the reaction step,
    an equivalent ratio (NCO/hydroxyl group) of an isocyanate group in an aliphatic polyisocyanate (A) to a hydroxyl group in a polyol (B) is 0.8 or more and 1.2 or less.

* * * * *